US012585290B2

(12) United States Patent　(10) Patent No.: US 12,585,290 B2
Amano　(45) Date of Patent: Mar. 24, 2026

(54) UNMANNED VEHICLE, SYSTEM OF CONTROLLING UNMANNED VEHICLE, AND METHOD OF CONTROLLING UNMANNED VEHICLE

(71) Applicant: Komatsu Ltd., Tokyo (JP)

(72) Inventor: Ryota Amano, Tokyo (JP)

(73) Assignee: KOMATSU LTD., Tokyo (JP)

( * ) Notice: Subject to any disclaimer, the term of this patent is extended or adjusted under 35 U.S.C. 154(b) by 5 days.

(21) Appl. No.: 18/688,810

(22) PCT Filed: Sep. 14, 2022

(86) PCT No.: PCT/JP2022/034330

§ 371 (c)(1),
(2) Date: Mar. 4, 2024

(87) PCT Pub. No.: WO2023/042836

PCT Pub. Date: Mar. 23, 2023

(65) Prior Publication Data

US 2024/0402726 A1　Dec. 5, 2024

(30) Foreign Application Priority Data

Sep. 14, 2021　(JP) ................................. 2021-149670

(51) Int. Cl.
G05D 1/622 (2024.01)
G05D 1/633 (2024.01)
G05D 105/05 (2024.01)

(52) U.S. Cl.
CPC ............. G05D 1/637 (2024.01); G05D 1/633 (2024.01); *G05D 2105/05* (2024.01)

(58) Field of Classification Search
CPC ..... G05D 1/637; G05D 1/633; G05D 2105/05
USPC .......................................................... 701/23
See application file for complete search history.

(56) References Cited

U.S. PATENT DOCUMENTS

| | | | | |
|---|---|---|---|---|
| 6,480,769 | B1 * | 11/2002 | Kageyama | G08G 1/207 |
| | | | | 701/411 |
| 10,444,755 | B2 * | 10/2019 | Kuroda | B60W 40/068 |
| 11,307,592 | B2 * | 4/2022 | Sudou | G06Q 10/047 |
| 2016/0185346 | A1 * | 6/2016 | Awamori | G05D 1/0272 |
| | | | | 701/23 |
| 2017/0017239 | A1 * | 1/2017 | Kanai | G05D 1/0055 |

FOREIGN PATENT DOCUMENTS

| | | |
|---|---|---|
| JP | H07-306997 A | 11/1995 |
| JP | 2001-109519 A | 4/2001 |
| JP | 2016-71568 A | 5/2016 |
| JP | 2019061478 A | 4/2019 |

* cited by examiner

*Primary Examiner* — Yazan A Soofi
(74) *Attorney, Agent, or Firm* — Troutman Pepper Locke LLP

(57) ABSTRACT

An unmanned vehicle includes: a travel device; an obstacle sensor; a host path storage unit that stores a host path; a travel control unit that controls the travel device based on the host path; an oncoming path storage unit that stores an oncoming path to be given to an oncoming vehicle; and an obstacle presence/absence determination unit that determines whether or not an obstacle is located on the oncoming path based on detection data from the obstacle sensor.

20 Claims, 10 Drawing Sheets

FIG.3

UNMANNED VEHICLE, SYSTEM OF CONTROLLING UNMANNED VEHICLE, AND METHOD OF CONTROLLING UNMANNED VEHICLE

FIELD

A technique disclosed in the present specification relates to an unmanned vehicle, a system of controlling the unmanned vehicle, and a method of controlling the unmanned vehicle.

BACKGROUND

In a wide-area work site such as a mine, unmanned vehicles operate. As disclosed in Patent Literature 1, a plurality of unmanned vehicles may travel on a travel path including two outward and return lanes.

CITATION LIST

Patent Literature

Patent Literature 1: JP 2001-109519 A

SUMMARY

Technical Problem

An obstacle located in a course of an unmanned vehicle hinders travel of the unmanned vehicle, and, as a result, may decrease productivity of a work site. Therefore, it is necessary to early detect an obstacle and take measures to inhibit the decrease in productivity of the work site.

An object of the technique disclosed in the present specification is to inhibit a decrease in productivity of a work site where an unmanned vehicle operates.

Solution to Problem

According to an aspect of the present invention, an unmanned vehicle comprises: a travel device; an obstacle sensor; a host path storage unit that stores a host path; a travel control unit that controls the travel device based on the host path; an oncoming path storage unit that stores an oncoming path to be given to an oncoming vehicle; and an obstacle presence/absence determination unit that determines whether or not an obstacle is located on the oncoming path based on detection data from the obstacle sensor.

Advantageous Effects of Invention

According to the technique disclosed in the present specification, a decrease in productivity of a work site where an unmanned vehicle operates is inhibited.

BRIEF DESCRIPTION OF DRAWINGS

FIG. 3 is a schematic diagram for illustrating travel data according to the embodiment.

DESCRIPTION OF EMBODIMENTS

Embodiments of the present disclosure will be described below with reference to the drawings, but the present disclosure is not limited to the embodiments. Components in the embodiments described below can be appropriately combined. Furthermore, some components are not used in some cases.

[Work Site]

Figure 1:
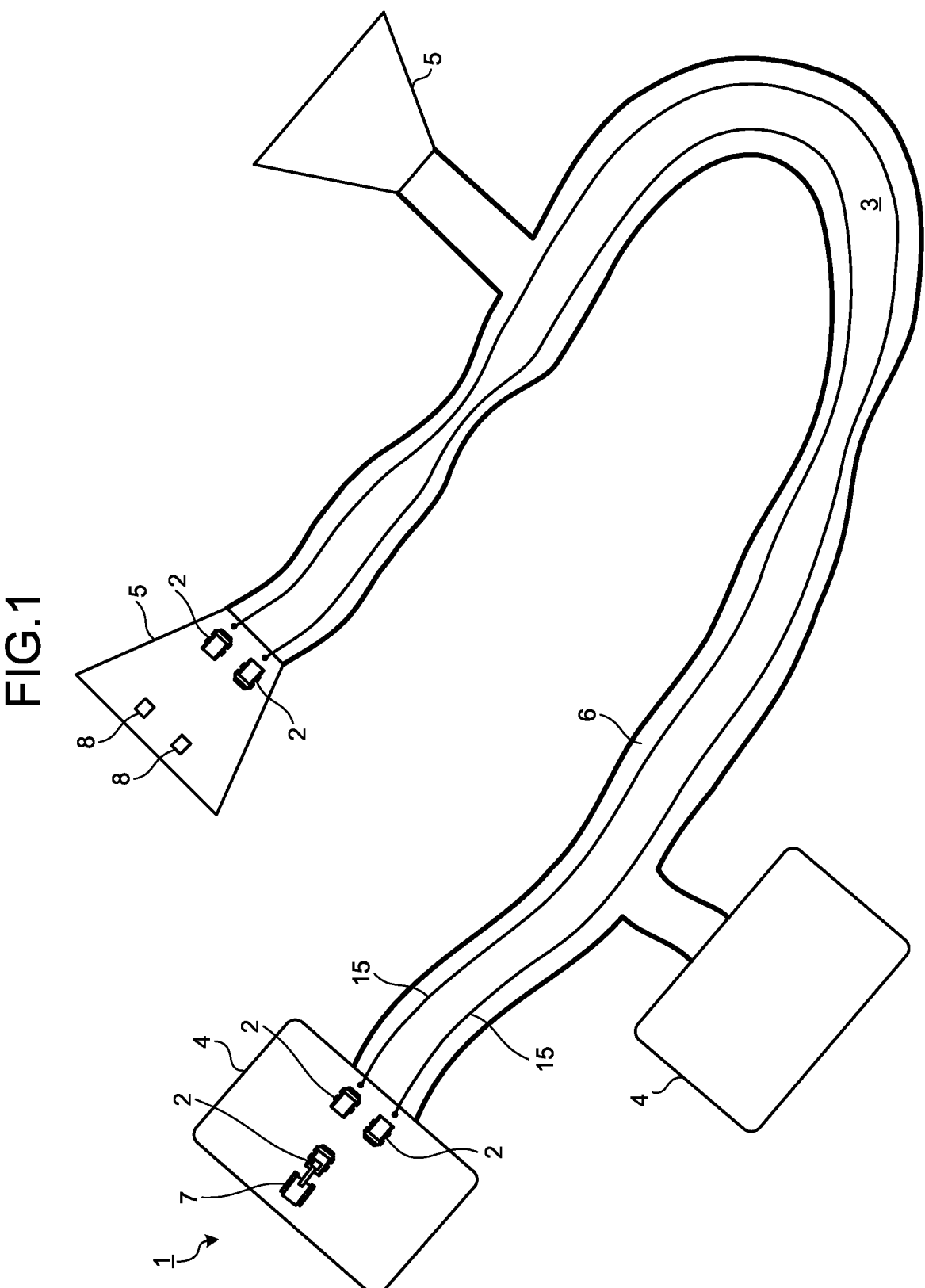
FIG. 1 is a schematic diagram illustrating a work site of an unmanned vehicle according to an embodiment.

FIG. 1 is a schematic diagram illustrating a work site 1 of an unmanned vehicle 2 according to an embodiment.

In the embodiment, the work site 1 is a mine. The mine refers to a place or business facilities for mining minerals. Examples of the mine include a metal mine for mining metal, a non-metal mine for mining limestone, and a coal mine for mining coal. In the work site 1, a plurality of unmanned vehicles 2 operates.

The unmanned vehicle 2 refers to a work vehicle that operates in an unmanned manner without depending on a driving operation of a driver. In the embodiment, the unmanned vehicle 2 is an unmanned dump truck that travels in the work site 1 in an unmanned manner and hauls a cargo. Examples of the cargo hauled by the unmanned vehicle 2 include excavated objects mined in the work site 1.

A travel area 3 is set in the work site 1. The travel area 3 is an area where the unmanned vehicle 2 can travel. The travel area 3 includes a loading place 4, a soil discharging place 5, and a travel path 6.

The loading place 4 refers to an area for performing loading work of loading a cargo on the unmanned vehicle 2. In the loading place 4, a loader 7 operates. Examples of the loader 7 include an excavator.

The soil discharging place 5 refers to an area where discharging work of discharging a cargo from the unmanned vehicle 2 is performed. A crusher 8 is disposed in the soil discharging place 5.

The travel path 6 refers to an area where the unmanned vehicle 2 travels toward at least one of the loading place 4 and the soil discharging place 5. The travel path 6 connects the loading place 4 with the soil discharging place 5. The unmanned vehicle 2 travels on the travel path 6 so as to reciprocate between the loading place 4 and the soil discharging place 5.

[Management System]

Figure 2:
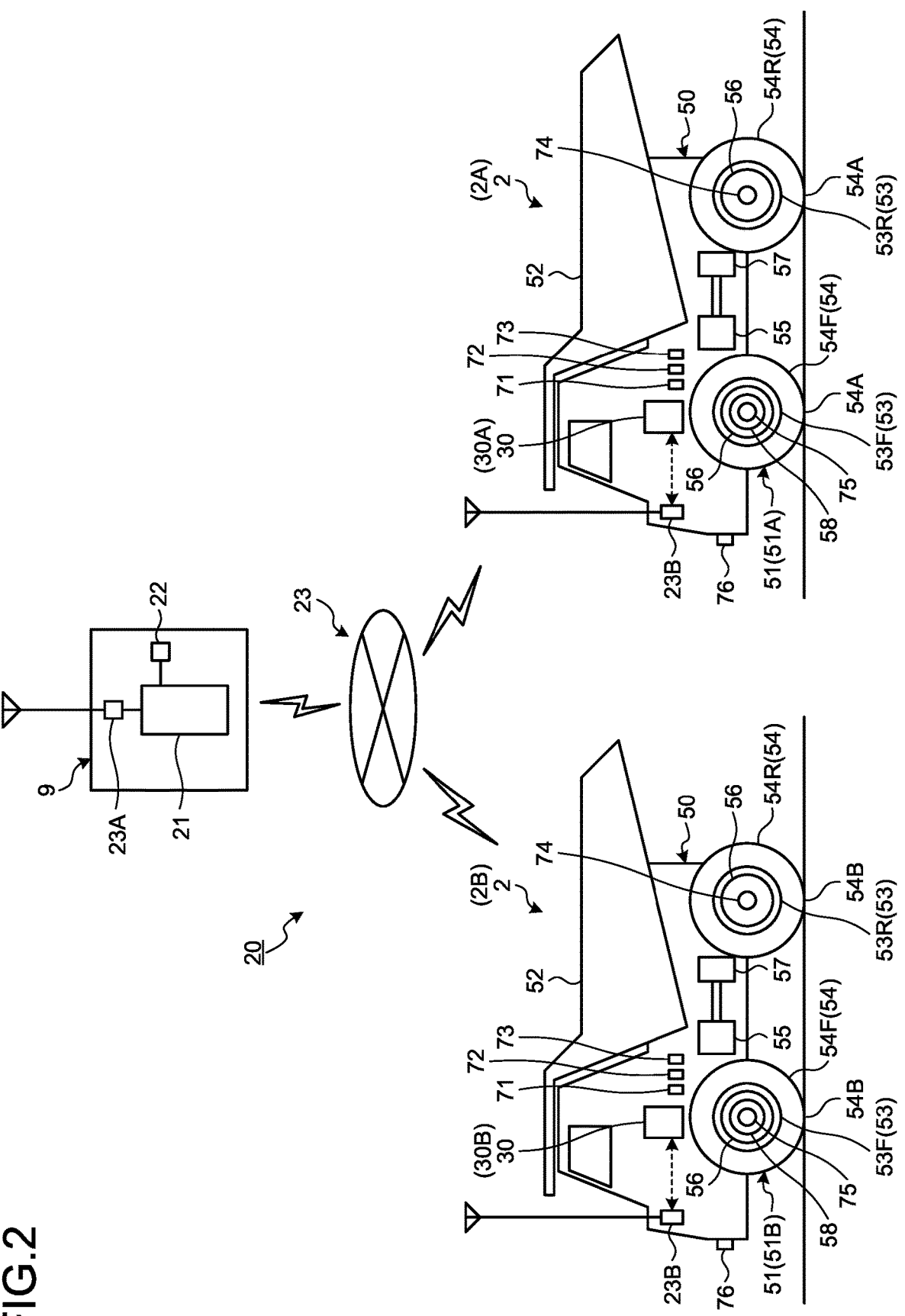
FIG. 2 is a schematic diagram illustrating a management system of the work site according to the embodiment.

FIG. 2 is a schematic diagram illustrating a management system 20 of the work site 1 according to the embodiment.

The management system 20 manages a plurality of unmanned vehicles 2 operating at the work site 1. The management system 20 includes a management device 21, an input device 22, and a communication system 23. Each of the management device 21 and the input device 22 is installed in a control facility 9 of the work site 1. An administrator is in the control facility 9.

The unmanned vehicle 2 includes a control device 30. The management device 21 and the control device 30 of the unmanned vehicle 2 wirelessly communicate with each other via the communication system 23. A wireless communication device 23A is connected to the management device 21. A wireless communication device 23B is connected to the control device 30. The communication system 23 includes the wireless communication device 23A and the wireless communication device 23B.

The administrator in the control facility 9 operates the input device 22. The input device 22 is operated by the administrator to generate input data. Examples of the input device 22 include a touch panel, a computer keyboard, a mouse, and an operation button.

The management device 21 includes a computer system. The management device 21 generates travel data indicating a travel condition of the unmanned vehicle 2. The management device 21 generates travel data for each of the plurality of unmanned vehicles 2. The administrator in the control facility 9 operates the input device 22 to input the travel condition of the unmanned vehicle 2 to the management device 21. The management device 21 generates the travel data based on the input data generated by the input device 22. The management device 21 transmits the travel data to the unmanned vehicle 2 via the communication system 23. The unmanned vehicle 2 travels in the work site 1 based on the travel data transmitted from the management device 21.

[Unmanned Vehicle]

As illustrated in FIG. 2, the unmanned vehicle 2 includes a vehicle body 50, a travel device 51, a dump body 52, a position sensor 71, an orientation sensor 72, an inclination sensor 73, a speed sensor 74, a steering sensor 75, an obstacle sensor 76, the wireless communication device 23B, and the control device 30.

The vehicle body 50 includes a vehicle body frame. The travel device 51 supports the vehicle body 50. The vehicle body 50 supports the dump body 52.

The travel device 51 causes the unmanned vehicle 2 to travel. The travel device 51 moves the unmanned vehicle 2 forward or backward. At least a part of the travel device 51 is disposed below the vehicle body 50. The travel device 51 includes wheels 53, tires 54, a drive device 55, brake devices 56, a transmission device 57, and a steering device 58.

The tires 54 are mounted on the wheels 53. The wheels 53 include front wheels 53F and rear wheels 53R. The tires 54 include front tires 54F and rear tires 54R. The front tires 54F are mounted on the front wheels 53F. The rear tires 54R are mounted on the rear wheels 53R. In the embodiment, the front wheels 53F are steering wheels. The rear wheels 53R are drive wheels.

The drive device 55 generates drive force for starting or accelerating the unmanned vehicle 2. Examples of the drive device 55 include an internal combustion engine and an electric motor. Examples of the internal combustion engine include a diesel engine.

The brake devices 56 generate brake force for stopping or decelerating the unmanned vehicle 2. Examples of the brake devices 56 include a disc brake and a drum brake.

The transmission device 57 transmits the drive force generated by the drive device 55 to the rear wheels 53R. The transmission device 57 includes a forward clutch and a backward clutch. Forward movement and backward movement of the unmanned vehicle 2 are switched between by switching a state of connection between the forward clutch and the backward clutch. The rear wheels 53R are rotated by the drive force generated by the drive device 55. The unmanned vehicle 2 travels in the work site 1 by rotation of the wheels 53 with the tires 54 being in contact with a road surface of the work site 1.

The steering device 58 generates steering force for adjusting a travel direction of the unmanned vehicle 2. The travel direction of the unmanned vehicle 2 moving forward refers to an orientation of a front portion of the vehicle body 50. The travel direction of the unmanned vehicle 2 moving backward refers to an orientation of a rear portion of the vehicle body 50. The front wheels 53F are steered by the steering device 58. The travel direction of the unmanned vehicle 2 is adjusted by the front wheels 53F being steered.

The dump body 52 is a member on which a cargo is loaded. At least a part of the dump body 52 is disposed above the vehicle body 50. The posture of the dump body 52 changes between a loading posture and a standing posture. The loading posture refers to a posture in which the dump body 52 is lowered so as to be closest to the vehicle body 50 within a movable range of the dump body 52. The standing posture refers to a posture in which the dump body 52 is raised so as to be most separated from the vehicle body 50 in the movable range of the dump body 52. A cargo is loaded into the dump body 52 at the time when the dump body 52 is in the loading posture. The unmanned vehicle 2 travels at the time when the dump body 52 is in the loading posture. The cargo is discharged from the dump body 52 by changing the posture of the dump body 52 from the loading posture to the standing posture with the cargo being loaded in the dump body 52.

The position sensor 71 detects a position of the unmanned vehicle 2. The position of the unmanned vehicle 2 is detected by using a global navigation satellite system (GNSS). The position sensor 71 includes a GNSS receiver. The position sensor 71 detects an absolute position indicating the position of the unmanned vehicle 2 in a global coordinate system.

The orientation sensor 72 detects an orientation of the unmanned vehicle 2. The orientation of the unmanned vehicle 2 includes a yaw angle of the unmanned vehicle 2. When an axis extending in the vertical direction of the vehicle body 50 is defined as a yaw angle, the yaw angle refers to an inclination angle of the unmanned vehicle 2 around the yaw axis. Examples of the orientation sensor 72 include a gyro sensor.

The inclination sensor 73 detects a posture of the unmanned vehicle 2. The posture of the unmanned vehicle 2 includes the inclination angle of the vehicle body 50. The inclination angle of the vehicle body 50 includes a pitch angle and a roll angle of the vehicle body 50. When an axis extending in a right and left direction (vehicle width direction) of the vehicle body 50 is defined as a pitch axis, the pitch angle refers to an inclination angle of the vehicle body 50 around the pitch axis. When an axis extending in a front and rear direction of the vehicle body 50 is defined as a roll angle, the roll angle refers to an inclination angle of the vehicle body 50 around the roll axis. Examples of the inclination sensor 73 include an inertial measurement unit (IMU).

The speed sensor 74 detects a travel speed of the unmanned vehicle 2. Examples of the speed sensor 74 include a pulse sensor that detects rotation of the wheels 53.

The steering sensor 75 detects a steering angle of the steering device 58. Examples of the steering sensor 75 include a potentiometer.

The obstacle sensor 76 detects an obstacle in a non-contact manner. The obstacle sensor 76 is disposed at a front portion of the vehicle body 50. Examples of the obstacle sensor 76 include a laser sensor (light detection and ranging (LIDAR)) and a radio detection and ranging (RADAR) sensor. Examples of the obstacle sensor 76 include an imaging device, such as a camera, which acquires an image of the surrounding environment and analyzes the image to detect an obstacle.

The control device 30 includes a computer system. The control device 30 is disposed in the vehicle body 50. The control device 30 outputs a control command for controlling the travel device 51. The control command output from the control device 30 includes a drive command for actuating the drive device 55, a brake command for actuating the brake devices 56, a forward/backward movement command for actuating the transmission device 57, and a steering command for actuating the steering device 58. The drive device 55 generates drive force for starting or accelerating the unmanned vehicle 2 based on a drive command output from the control device 30. The brake devices 56 generate brake force for stopping or decelerating the unmanned vehicle 2 based on a brake command output from the control device 30. The transmission device 57 switches between the forward movement and the backward movement of the unmanned vehicle 2 based on a forward/backward movement command output from the control device 30. The steering device 58 generates steering force for causing the unmanned vehicle 2 to travel straight or turn based on a steering command output from the control device 30.

[Travel Data]

Figure 3:
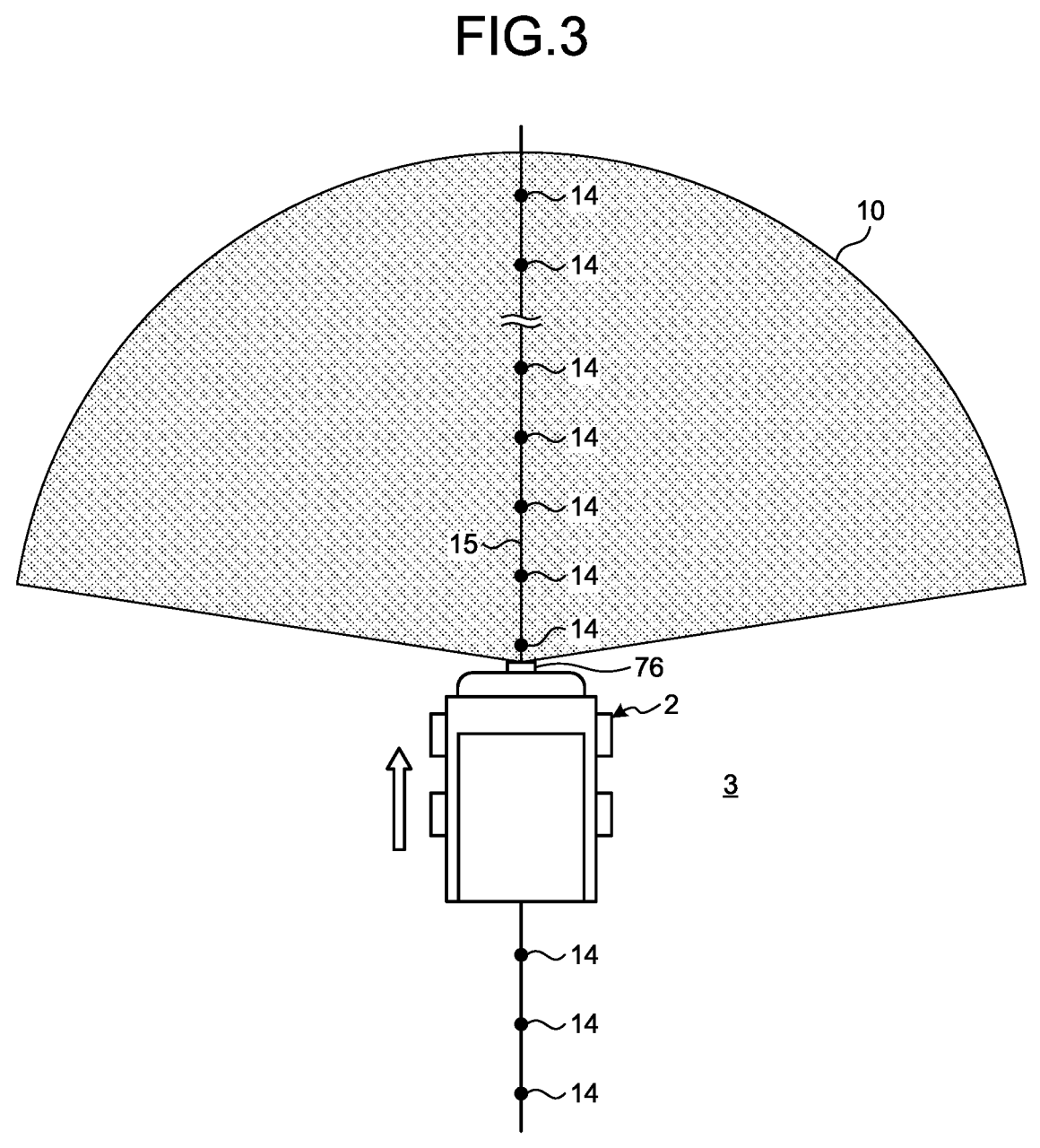

FIG. 3 is a schematic diagram for illustrating travel data according to the embodiment.

The travel data specifies a travel condition of the unmanned vehicle 2. The travel data includes travel points 14, a travel path 15, target positions of the unmanned vehicle 2, target travel speeds of the unmanned vehicle 2, and target orientations of the unmanned vehicle 2.

A plurality of travel points 14 is set in the travel area 3. The travel points 14 specify the target positions of the unmanned vehicle 2. A target travel speed of the unmanned vehicle 2 and a target orientation of the unmanned vehicle 2 are set for each of the plurality of travel points 14. The plurality of travel points 14 is set at intervals. The intervals between the travel points 14 are set to, for example, 1 [m] or more and 5 [m] or less. The intervals between the travel points 14 may be uniform or non-uniform.

The travel path 15 refers to a virtual line indicating a target travel route of the unmanned vehicle 2. The travel path 15 is specified by a track passing through the plurality of travel points 14.

The target positions of the unmanned vehicle 2 refer to target positions of the unmanned vehicle 2 at the time when the unmanned vehicle 2 passes through the travel points 14. The target positions of the unmanned vehicle 2 may be specified in a local coordinate system of the unmanned vehicle 2 or a global coordinate system.

The target travel speeds of the unmanned vehicle 2 refer to target travel speeds of the unmanned vehicle 2 at the time when the unmanned vehicle 2 passes through the travel points 14.

The target orientations of the unmanned vehicle 2 refer to target orientations of the unmanned vehicle 2 at the time when the unmanned vehicle 2 passes through the travel points 14.

The control device 30 of the unmanned vehicle 2 controls the travel device 51 based on the travel data.

The control device 30 controls the travel device 51 so that the unmanned vehicle 2 travels along the travel path 15. In the embodiment, the control device 30 controls the travel device 51 so that the unmanned vehicle 2 travels with the center of the unmanned vehicle 2 in the vehicle width direction coinciding with the travel path 15.

The control device 30 controls the travel device 51 so that actual positions of the unmanned vehicle 2 at the time when the unmanned vehicle 2 passes through the travel points 14 correspond to the target positions based on detection data from the position sensor 71. The control device 30 controls the travel device 51 so that the unmanned vehicle 2 travels along the travel path 15 based on the detection data from the position sensor 71.

The control device 30 controls the travel device 51 so that actual orientations of the unmanned vehicle 2 at the time when the unmanned vehicle 2 passes through the travel points 14 correspond to the target orientations based on detection data from the orientation sensor 72. The control device 30 controls the travel device 51 so that there is no deviations between the actual positions of the unmanned vehicle 2 and the target positions of the unmanned vehicle 2 specified by the travel points 14 and so that the actual orientations of the unmanned vehicle 2 at the time when the unmanned vehicle 2 passes through the travel points 14 correspond to the target orientations.

The control device 30 calculates the postures of the unmanned vehicle 2 at the travel points 14 based on detection data from the inclination sensor 73 at the time when the unmanned vehicle 2 passes through the travel points 14 and the terrains at the travel points 14.

The control device 30 controls the travel device 51 so that actual travel speeds of the unmanned vehicle 2 at the time when the unmanned vehicle 2 passes through the travel points 14 correspond to the target travel speeds based on detection data from the speed sensor 74.

The control device 30 controls the travel device 51 so that actual steering angles of the unmanned vehicle 2 at the time when the unmanned vehicle 2 passes through the travel points 14 correspond to target steering angles based on detection data from the steering sensor 75.

The obstacle sensor 76 detects an obstacle in front in a course of the unmanned vehicle 2. The obstacle sensor 76 can detect an obstacle disposed in a detection range 10 of the obstacle sensor 76. The detection range 10 is specified so as to include the travel path 15 in front in the course of the unmanned vehicle 2. The control device 30 controls the travel device 51 so that the unmanned vehicle 2 decelerates or stops at the time when it is determined that an obstacle is located on the travel path 15 in front in the course of the unmanned vehicle 2 based on detection data from the obstacle sensor 76.

[Travel Mode of Unmanned Vehicle]

Figure 4:
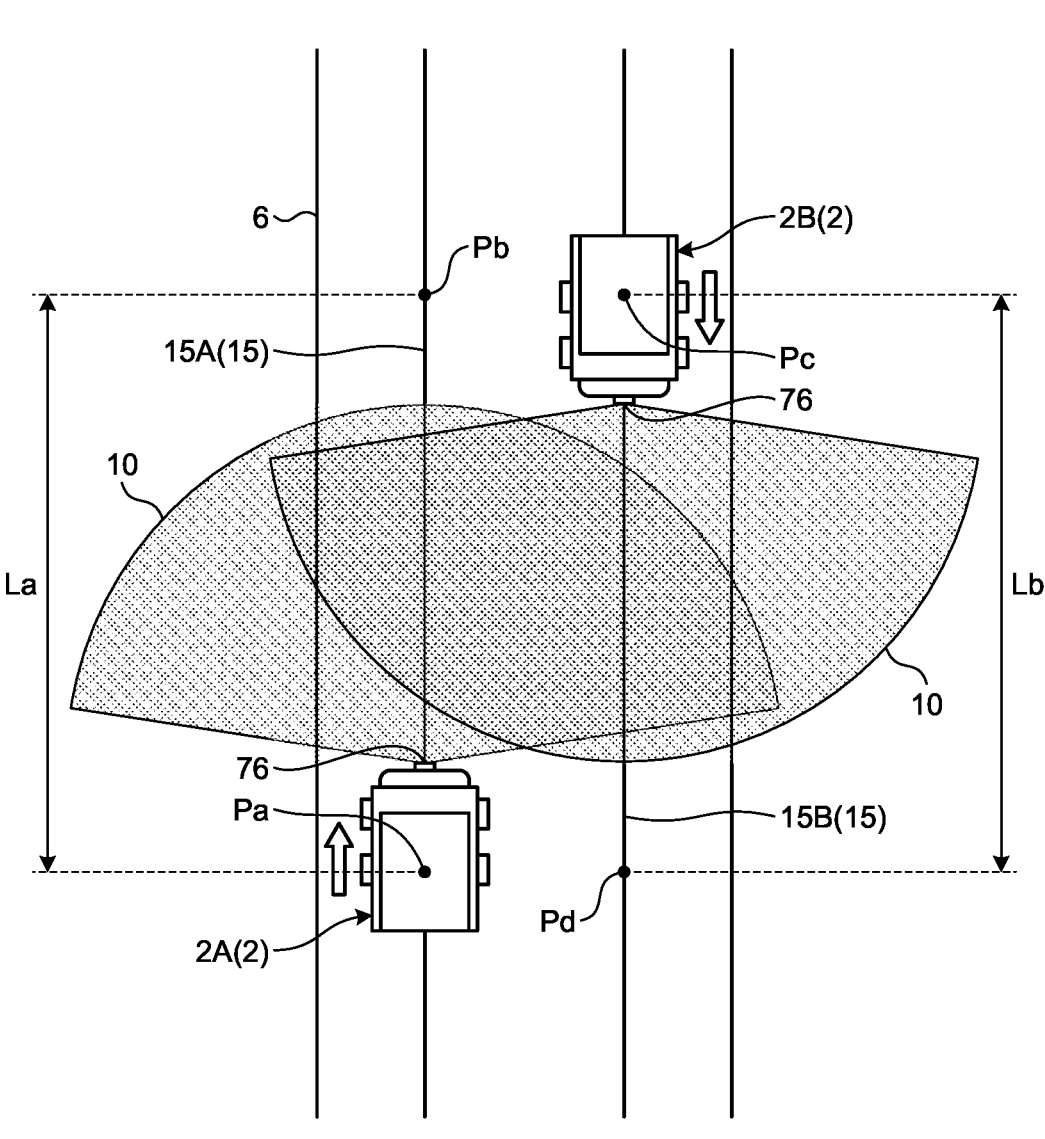
FIG. 4 is a schematic diagram for illustrating a travel mode of the unmanned vehicle according to the embodiment.

FIG. 4 is a schematic diagram for illustrating a travel mode of the unmanned vehicle 2 according to the embodiment.

As illustrated in FIG. 4, two unmanned vehicles 2 may travel so as to pass each other on the travel path 6. In the example in FIG. 4, a first unmanned vehicle 2A among the two unmanned vehicles 2 travels in an outward path direction on a left travel lane of the travel path 6, and a second unmanned vehicle 2B thereamong travels in a return path direction on a right travel lane of the travel path 6. The second unmanned vehicle 2B corresponds to an oncoming vehicle of the first unmanned vehicle 2A. The first unmanned vehicle 2A and the second unmanned vehicle 2B pass facing each other.

The management device 21 gives the travel path 15 to each of the first unmanned vehicle 2A and the second unmanned vehicle 2B. The travel path 15 includes a first travel path 15A to be given to the first unmanned vehicle 2A and a second travel path 15B to be given to the second unmanned vehicle 2B. The first unmanned vehicle 2A travels along the first travel path 15A given from the management device 21. The second unmanned vehicle 2B travels along the second travel path 15B given from the management device 21. The first travel path 15A and the second travel path 15B are specified so as to be adjacent to each other. In the example in FIG. 4, the first travel path 15A and the second travel path 15B are substantially parallel to each other.

[Detection of Obstacle]

Figure 5:
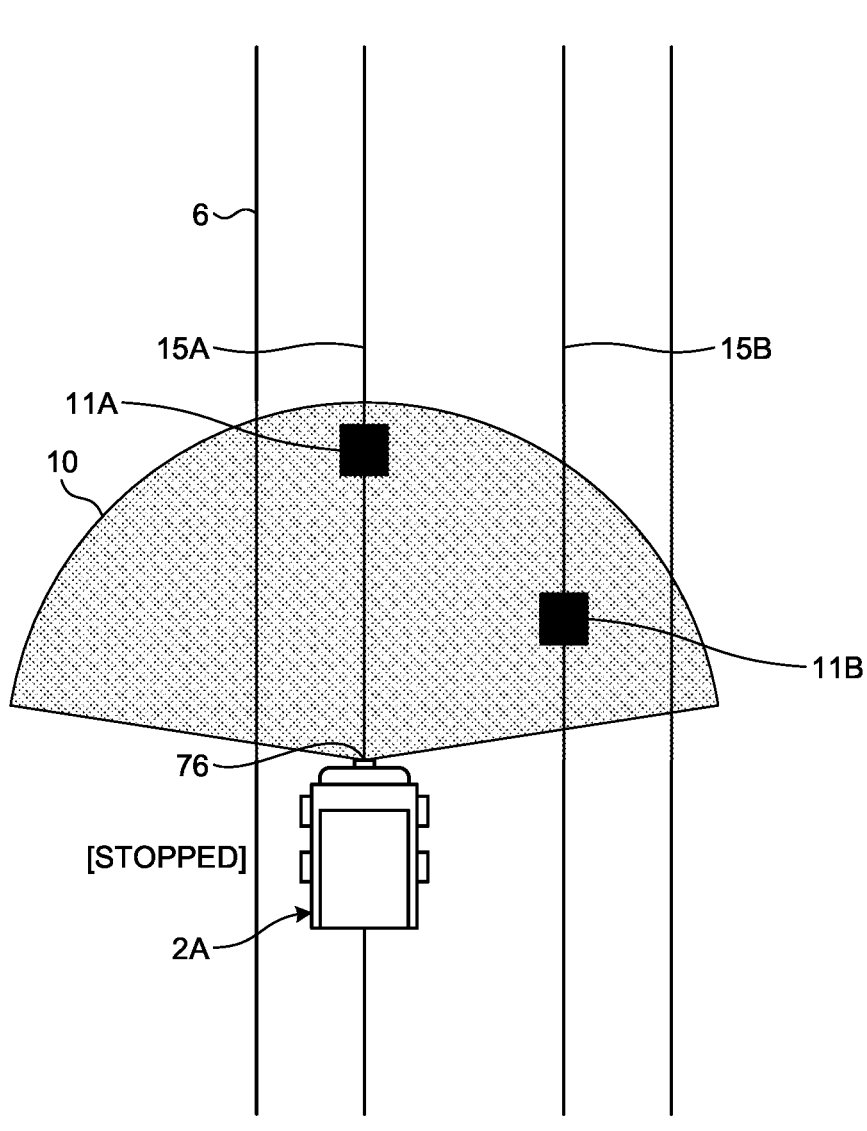
FIG. 5 is a schematic diagram illustrating a state in which an obstacle sensor of a first unmanned vehicle according to the embodiment detects an obstacle located on a travel path.

FIG. 5 is a schematic diagram illustrating a state in which the obstacle sensor 76 of the first unmanned vehicle 2A according to the embodiment detects an obstacle located on the travel path 6.

When an obstacle 11A is located on the first travel path 15A in front in a course of the first unmanned vehicle 2A, the obstacle sensor 76 of the first unmanned vehicle 2A can detect the obstacle 11A. When the obstacle 11A is detected, the control device 30 of the first unmanned vehicle 2A decelerates or stops the first unmanned vehicle 2A.

When the obstacle sensor 76 has a large detection range 10, the detection range 10 of the obstacle sensor 76 of the first unmanned vehicle 2A is specified so as to include not only the first travel path 15A in front in the course of the first unmanned vehicle 2A but the second travel path 15B next to the first travel path 15A. The obstacle sensor 76 of the first unmanned vehicle 2A can detect not only the obstacle 11A located on the first travel path 15A but an obstacle 11B located on the second travel path 15B.

In the embodiment, the first unmanned vehicle 2A is given not only the first travel path 15A but the second travel path 15B. The control device 30 of the first unmanned vehicle 2A can determine whether or not the obstacle 11B is located on the second travel path 15B based on the detection data from the obstacle sensor 76 and the second travel path 15B.

[Control System]

Figure 6:
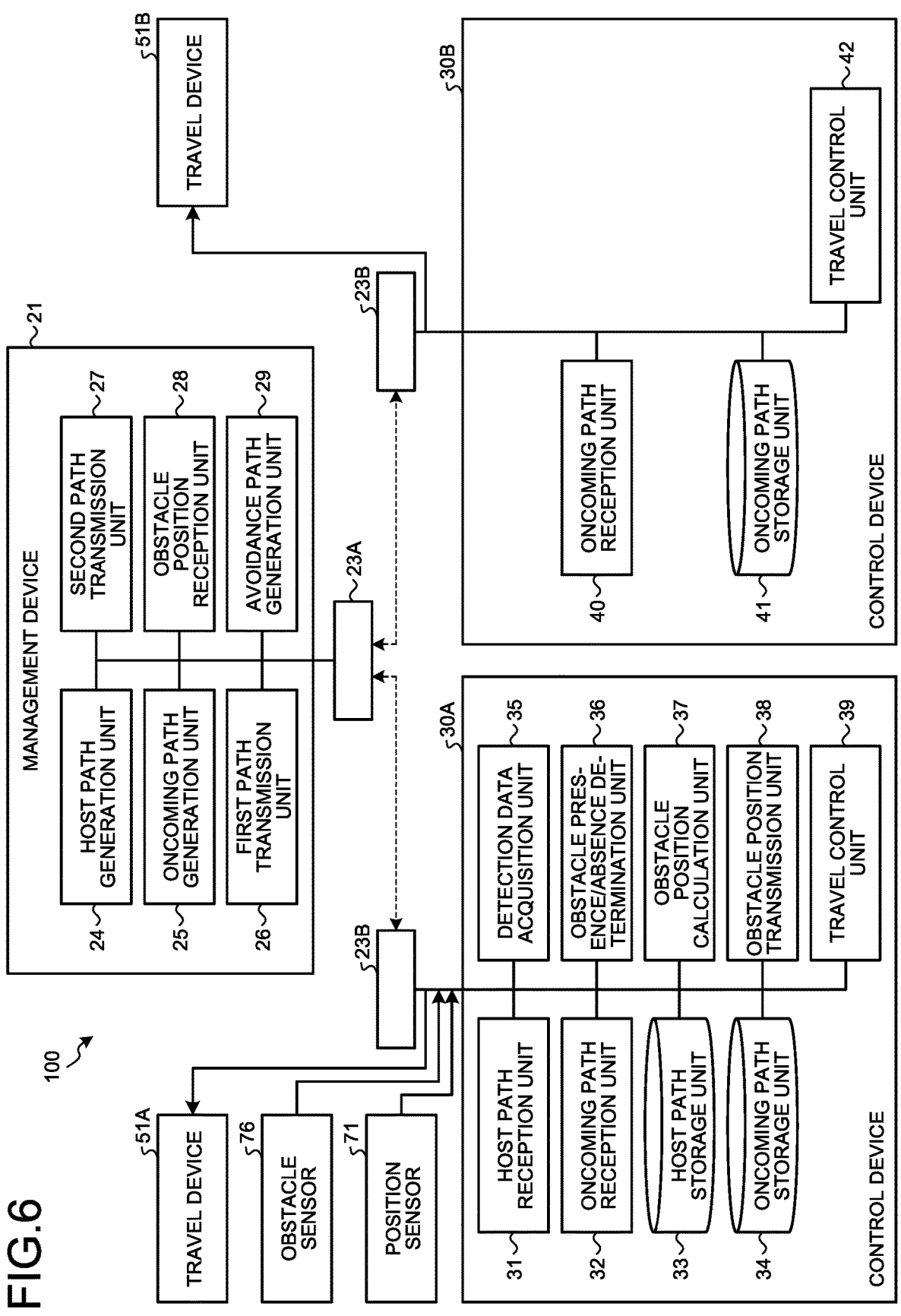
FIG. 6 is a functional block diagram illustrating a system of controlling the unmanned vehicle according to the embodiment.

FIG. 6 is a functional block diagram illustrating a control system 100 of the unmanned vehicle 2 according to the embodiment.

In the following description, the first travel path 15A described with reference to FIGS. 4 and 5 will be appropriately referred to as a host path 15A, and the second travel path 15B will be appropriately referred to as an oncoming path 15B.

In the following description, the first unmanned vehicle 2A described with reference to FIGS. 4 and 5 will be appropriately referred to as a host vehicle 2A, and the second unmanned vehicle 2B will be appropriately referred to as an oncoming vehicle 2B.

In the following description, the control device 30 of the first unmanned vehicle 2A will be appropriately referred to as a control device 30A, and the control device 30 of the second unmanned vehicle 2B will be appropriately referred to as a control device 30B.

In the following description, the travel device 51 of the first unmanned vehicle 2A will be appropriately referred to as a travel device 51A, and the travel device 51 of the second unmanned vehicle 2B will be appropriately referred to as a travel device 51B.

The control system 100 includes the management device 21, the control device 30A, and the control device 30B.

The management device 21 includes a host path generation unit 24, an oncoming path generation unit 25, a first path transmission unit 26, a second path transmission unit 27, an obstacle position reception unit 28, and an avoidance path generation unit 29.

The control device 30A includes a host path reception unit 31, an oncoming path reception unit 32, a host path storage unit 33, an oncoming path storage unit 34, a detection data acquisition unit 35, an obstacle presence/absence determination unit 36, an obstacle position calculation unit 37, an obstacle position transmission unit 38, and a travel control unit 39.

The control device 30B includes an oncoming path reception unit 40, an oncoming path storage unit 41, and a travel control unit 42.

The host path generation unit 24 generates the host path 15A to be given to the host vehicle 2A. Generating the host path 15A includes generating travel data of the host vehicle 2A. In the embodiment, the host path generation unit 24 generates host paths 15A in the entire work site 1.

The oncoming path generation unit 25 generates the oncoming path 15B to be given to the oncoming vehicle 2B. Generating the oncoming path 15B includes generating travel data of the oncoming vehicle 2B. In the embodiment, the oncoming path generation unit 25 generates oncoming paths 15B in the entire work site 1.

The first path transmission unit 26 transmits the host path 15A generated by the host path generation unit 24 to the control device 30A of the host vehicle 2A. Transmitting the host path 15A includes transmitting travel data of the host vehicle 2A. In the embodiment, the first path transmission unit 26 transmits some host paths 15A generated by the host path generation unit 24 to the control device 30A.

As illustrated in FIG. 4, the first path transmission unit 26 transmits, to the control device 30A, some host paths 15A in front in the course of the host vehicle 2A among the host paths 15A in the entire work site 1 generated by the host path generation unit 24. That is, the first path transmission unit 26 transmits, to the control device 30A, a host path 15A between a host position Pa and a front position Pb among the host paths 15A in the entire work site 1 generated by the host path generation unit 24. The host position Pa indicates the position of the host vehicle 2A. The front position Pb is away from the host position Pa by a predetermined distance La toward the front in the course of the host vehicle 2A. The predetermined distance La may be, for example, 50 [m] or more and 200 [m] or less. The predetermined distance La may be, for example, twice or more and five times or less the dimension in the front and rear direction of the host vehicle 2A. The position sensor 71 of the host vehicle 2A detects the host position Pa. The host position Pa indicates an absolute position of the host vehicle 2A. The control device 30A of the host vehicle 2A transmits, to the management device 21, the host position Pa of the host vehicle 2A detected by the position sensor 71 of the host vehicle 2A. The predetermined distance La is a predetermined value. Therefore, the first path transmission unit 26 can transmit, to the control device 30A, the host path 15A between the host position Pa and the front position Pb based on the host position Pa of the host vehicle 2A transmitted from the control device 30A and the predetermined distance La. As the host vehicle 2A advances, the host position Pa of the host vehicle 2A changes. As the host position Pa of the host vehicle 2A changes, the first path transmission unit 26 sequentially updates the host path 15A to be transmitted to the control device 30A.

The second path transmission unit 27 transmits the oncoming path 15B generated by the oncoming path generation unit 25 to the control device 30B of the oncoming vehicle 2B. Transmitting the oncoming path 15B includes transmitting travel data of the oncoming vehicle 2B. In the embodiment, the second path transmission unit 27 transmits, to the control device 30B, some oncoming paths 15B generated by the oncoming path generation unit 25.

As illustrated in FIG. 4, the second path transmission unit 27 transmits, to the control device 30B, some oncoming paths 15B in front in the course of the oncoming vehicle 2B among the oncoming paths 15B in the entire work site 1 generated by the oncoming path generation unit 25. That is, the second path transmission unit 27 transmits, to the control device 30B, an oncoming path 15B between another vehicle position Pc and a front position Pd among the oncoming paths 15B in the entire work site 1 generated by the oncoming path generation unit 25. The other vehicle position Pc indicates the position of the oncoming vehicle 2B. The front position Pd is away from the other vehicle position Pc by a predetermined distance Lb toward the front in the course of the oncoming vehicle 2B. The predetermined distance Lb may be, for example, 50 [m] or more and 200 [m] or less. The predetermined distance Lb may be, for example, twice or more and five times or less the dimension in the front and rear direction of the oncoming vehicle 2B. The predetermined distance Lb may be the same as or different from the predetermined distance La. The position sensor 71 of the oncoming vehicle 2B detects the other vehicle position Pc. The other vehicle position Pc indicates an absolute position of the oncoming vehicle 2B. The control device 30B of the oncoming vehicle 2B transmits, to the management device 21, the other vehicle position Pc of the oncoming vehicle 2B detected by the position sensor 71 of the oncoming vehicle 2B. The predetermined distance Lb is a predetermined value. Therefore, the second path transmission unit 27 can transmit, to the control device 30B, the oncoming path 15B between the other vehicle position Pc and the front position Pd based on the other vehicle position Pc of the oncoming vehicle 2B transmitted from the control device 30B and the predetermined distance Lb. As the oncoming vehicle 2B advances, the other vehicle position Pc of the oncoming vehicle 2B changes. As the other vehicle position Pc of the oncoming vehicle 2B changes, the second path transmission unit 27 sequentially updates the oncoming path 15B to be transmitted to the control device 30B.

In the embodiment, the first path transmission unit 26 transmits, to the control device 30A of the host vehicle 2A, both some host paths 15A generated by the host path generation unit 24 and some oncoming paths 15B generated by the oncoming path generation unit 25.

The host path 15A transmitted from the first path transmission unit 26 to the control device 30A is a host path 15A in the predetermined distance La between the host position Pa and the front position Pb. The oncoming path 15B transmitted from the first path transmission unit 26 to the control device 30A is an oncoming path 15B in the predetermined distance Lb specified next to the host path 15A between the host position Pa and the front position Pb. That is, the first path transmission unit 26 transmits, to the control device 30A of the host vehicle 2A, an oncoming path 15B between the host position Pa and the front position Pb in an advance direction of the host vehicle 2A. The first path transmission unit 26 can transmit, to the control device 30A, the oncoming path 15B in the predetermined distance Lb specified next to the host path 15A between the host position Pa and the front position Pb based on the host position Pa of the host vehicle 2A transmitted from the control device 30A and the predetermined distance Lb. As the host vehicle 2A advances, the host position Pa of the host vehicle 2A changes. As the host position Pa of the host vehicle 2A changes, the first path transmission unit 26 sequentially updates the oncoming path 15B to be transmitted to the control device 30A.

In the following description, the host path 15A in the predetermined distance La between the host position Pa and the front position Pb to be transmitted from the first path transmission unit 26 to the control device 30A will be appropriately referred to as the host path 15A in front in the course of the host vehicle 2A. Furthermore, the oncoming path 15B in the predetermined distance Lb specified next to the host path 15A in the predetermined distance La between the host position Pa and the front position Pb to be transmitted from the first path transmission unit 26 to the control device 30A will be appropriately referred to as the oncoming path 15B next to the host path 15A.

In the following description, the oncoming path 15B in the predetermined distance Lb between the other vehicle position Pc and the front position Pd to be transmitted from the second path transmission unit 27 to the control device 30B will be appropriately referred to as the oncoming path 15B in front in the course of the oncoming vehicle 2B.

The oncoming path 15B next to the host path 15A to be transmitted from the first path transmission unit 26 to the control device 30A includes the oncoming path 15B in front in the course of the oncoming vehicle 2B. That is, the oncoming path 15B next to the host path 15A to be transmitted from the first path transmission unit 26 to the control device 30A includes the oncoming path 15B on which the oncoming vehicle 2B is scheduled to travel.

The obstacle position reception unit 28 receives a position of the obstacle 11A calculated based on the detection data from the obstacle sensor 76 of the host vehicle 2A. The obstacle position reception unit 28 receives the position of the obstacle 11B calculated based on the detection data from the obstacle sensor 76 of the host vehicle 2A. In the embodiment, the control device 30A of the host vehicle 2A calculates the position of the obstacle 11A and the position of the obstacle 11B. When the control device 30A calculates the position of the obstacle 11A, the obstacle position reception unit 28 receives the position of the obstacle 11A from the control device 30A. When the control device 30A calculates the position of the obstacle 11B, the obstacle position reception unit 28 receives the position of the obstacle 11B from the control device 30A.

The avoidance path generation unit 29 generates an avoidance path 15C for causing the oncoming vehicle 2B to avoid the obstacle 11B in at least a part of the oncoming path 15B based on the position of the obstacle 11B received by the obstacle position reception unit 28. The travel path 15 includes the avoidance path 15C. The avoidance path 15C is generated in the oncoming path 15B in front in the course of the oncoming vehicle 2B. When the avoidance path generation unit 29 generates the avoidance path 15C, the second path transmission unit 27 transmits the avoidance path 15C to the oncoming vehicle 2B.

The host path reception unit 31 receives the host path 15A transmitted from the management device 21. Receiving the host path 15A includes receiving travel data of the host vehicle 2A. The host path reception unit 31 receives the host path 15A in front in the course of the host vehicle 2A.

The oncoming path reception unit 32 receives the oncoming path 15B transmitted from the management device 21. Receiving the oncoming path 15B includes receiving travel data of the oncoming vehicle 2B. The oncoming path reception unit 32 receives the oncoming path 15B next to the host path 15A.

The host path storage unit 33 stores the host path 15A received by the host path reception unit 31. Storing the host path 15A includes storing travel data of the host vehicle 2A. The host path storage unit 33 stores the host path 15A in front in the course of the host vehicle 2A.

The oncoming path storage unit 34 stores the oncoming path 15B received by the oncoming path reception unit 32. Storing the oncoming path 15B includes storing travel data of the oncoming vehicle 2B. The oncoming path storage unit 34 stores the oncoming path 15B next to the host path 15A.

The detection data acquisition unit 35 acquires the detection data from the obstacle sensor 76 of the host vehicle 2A. The detection data acquisition unit 35 acquires the detection data from the position sensor 71 of the host vehicle 2A.

The obstacle presence/absence determination unit 36 determines whether or not the obstacle 11A is located on the host path 15A in front in the course of the host vehicle 2A based on the detection data from the obstacle sensor 76 of the host vehicle 2A acquired by the detection data acquisition unit 35. The host path 15A in front in the course of the host vehicle 2A includes a position of the host vehicle 2A at which the host vehicle 2A is scheduled to travel. The obstacle presence/absence determination unit 36 can determine whether or not the obstacle 11A is located on the host path 15A in front in the course of the host vehicle 2A based on the detection data from the obstacle sensor 76 of the host vehicle 2A acquired by the detection data acquisition unit 35 and the host path 15A stored in the host path storage unit 33.

The obstacle presence/absence determination unit 36 determines whether or not the obstacle 11B is located on the oncoming path 15B next to the host path 15A based on the detection data from the obstacle sensor 76 of the host vehicle 2A acquired by the detection data acquisition unit 35. The oncoming path 15B next to the host path 15A includes a position of the oncoming vehicle 2B at which the oncoming vehicle 2B is scheduled to travel. The obstacle presence/absence determination unit 36 can determine whether or not the obstacle 11B is located on the oncoming path 15B next to the host path 15A based on the detection data from the obstacle sensor 76 of the host vehicle 2A acquired by the detection data acquisition unit 35 and the oncoming path 15B stored in the oncoming path storage unit 34.

The obstacle position calculation unit 37 calculates the position of the obstacle 11A located on the host path 15A in front in the course of the host vehicle 2A based on the detection data from the position sensor 71 of the host vehicle 2A acquired by the detection data acquisition unit 35 and the detection data from the obstacle sensor 76 of the host vehicle 2A. The position sensor 71 detects the host position Pa of the host vehicle 2A. The host position Pa of the host vehicle 2A detected by the position sensor 71 is an absolute position. The obstacle sensor 76 detects relative positions of the host vehicle 2A and the obstacle 11A. Therefore, the obstacle position calculation unit 37 can calculate the absolute position of the obstacle 11A based on the detection data from the position sensor 71 of the host vehicle 2A and the detection data from the obstacle sensor 76 of the host vehicle 2A.

The obstacle presence/absence determination unit 36 can calculate the relative positions of the host path 15A in front in the course of the host vehicle 2A and the obstacle 11A based on the detection data from the position sensor 71 of the host vehicle 2A, the detection data from the obstacle sensor 76 of the host vehicle 2A, and the host path 15A stored in the host path storage unit 33. The obstacle presence/absence determination unit 36 can highly accurately determine whether or not the obstacle 11A is located on the host path 15A in front in the course of the host vehicle 2A based on the detection data from the position sensor 71 of the host vehicle 2A, the detection data from the obstacle sensor 76 of the host vehicle 2A, and the host path 15A stored in the host path storage unit 33.

The obstacle position calculation unit 37 calculates the position of the obstacle 11B located on the oncoming path 15B next to the host path 15A based on the detection data from the position sensor 71 of the host vehicle 2A acquired by the detection data acquisition unit 35 and the detection data from the obstacle sensor 76 of the host vehicle 2A. The obstacle position calculation unit 37 can calculate the absolute position of the obstacle 11B based on the detection data from the position sensor 71 of the host vehicle 2A and the detection data from the obstacle sensor 76 of the host vehicle 2A.

The obstacle presence/absence determination unit 36 can calculate the relative positions of the oncoming path 15B next to the host path 15A and the obstacle 11B based on the detection data from the position sensor 71 of the host vehicle 2A, the detection data from the obstacle sensor 76 of the host vehicle 2A, and the oncoming path 15B stored in the oncoming path storage unit 34. The obstacle presence/absence determination unit 36 can highly accurately determine whether or not the obstacle 11B is located on the oncoming path 15B next to the host path 15A based on the detection data from the position sensor 71 of the host vehicle 2A, the detection data from the obstacle sensor 76 of the host vehicle 2A, and the oncoming path 15B stored in the oncoming path storage unit 34.

The obstacle position transmission unit 38 transmits, to the management device 21, the position of the obstacle 11A calculated by the obstacle position calculation unit 37. The obstacle position transmission unit 38 transmits, to the management device 21, the position of the obstacle 11B calculated by the obstacle position calculation unit 37.

The obstacle position reception unit 28 of the management device 21 receives the position of the obstacle 11A transmitted from the obstacle position transmission unit 38. The obstacle position reception unit 28 of the management device 21 receives the position of the obstacle 11B transmitted from the obstacle position transmission unit 38.

The travel control unit 39 controls the travel device 51A of the host vehicle 2A based on the host path 15A stored in the host path storage unit 33. The travel control unit 39 controls the travel device 51A so that the host vehicle 2A travels along the host path 15A.

The oncoming path reception unit 40 receives the oncoming path 15B transmitted from the management device 21. Receiving the oncoming path 15B includes receiving travel data of the oncoming vehicle 2B. The oncoming path reception unit 40 receives the oncoming path 15B in front in the course of the oncoming vehicle 2B. The oncoming path reception unit 40 receives the avoidance path 15C transmitted from the management device 21.

The oncoming path storage unit 41 stores the oncoming path 15B received by the oncoming path reception unit 40. Storing the oncoming path 15B includes storing travel data of the oncoming vehicle 2B. The oncoming path storage unit 41 stores the oncoming path 15B in front in the course of the oncoming vehicle 2B. The oncoming path storage unit 41 stores the avoidance path 15C received by the oncoming path reception unit 40.

The travel control unit 42 controls the travel device 51B of the oncoming vehicle 2B based on the oncoming path 15B stored in the oncoming path storage unit 41. The travel control unit 42 controls the travel device 51B so that the oncoming vehicle 2B travels along the oncoming path 15B.

When the avoidance path 15C is stored in the oncoming path storage unit 41, the travel control unit 42 controls the travel device 51B of the oncoming vehicle 2B based on at least one of the oncoming path 15B and the avoidance path 15C.

[Control Method]

Figure 7:
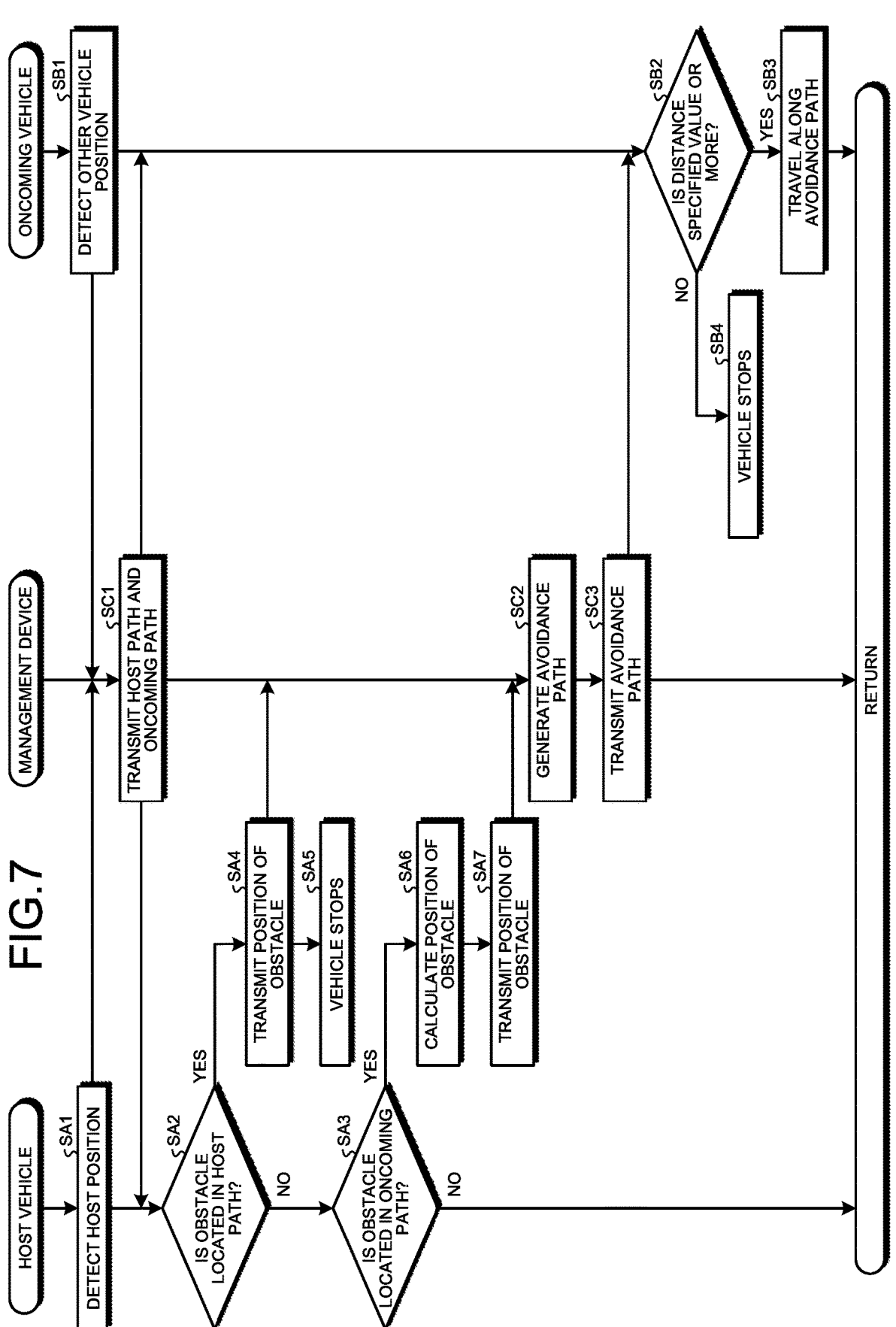
FIG. 7 is a flowchart illustrating a method of controlling the unmanned vehicle according to the embodiment.

FIG. 7 is a flowchart illustrating a method of controlling the unmanned vehicle 2 according to the embodiment. Each of the host vehicle 2A and the oncoming vehicle 2B travels on the travel path 6.

The position sensor 71 of the host vehicle 2A detects the host position Pa of the host vehicle 2A. The control device 30A of the host vehicle 2A transmits, to the management device 21, the host position Pa of the host vehicle 2A detected by the position sensor 71 of the host vehicle 2A (Step SA1).

The position sensor 71 of the oncoming vehicle 2B detects the other vehicle position Pc of the oncoming vehicle 2B. The control device 30B of the oncoming vehicle 2B transmits, to the management device 21, the other vehicle position Pc of the oncoming vehicle 2B detected by the position sensor 71 of the oncoming vehicle 2B (Step SB1).

The management device 21 receives the host position Pa transmitted from the control device 30A. The management device 21 receives the other vehicle position Pc transmitted from the control device 30B.

The first path transmission unit 26 transmits the host path 15A in front in the course of the host vehicle 2A to the control device 30A based on the host position Pa transmitted from the control device 30A. Furthermore, the first path transmission unit 26 transmits the oncoming path 15B next to the host path 15A to the control device 30A. The second path transmission unit 27 transmits the oncoming path 15B in front in the course of the oncoming vehicle 2B to the control device 30B based on the other vehicle position Pc transmitted from the control device 30B (Step SC1).

The control device 30A receives the host path 15A in front in the course of the host vehicle 2A transmitted from the management device 21 and the oncoming path 15B of the host path 15A. The host path storage unit 33 stores the host path 15A in front in the course of the host vehicle 2A transmitted from the management device 21. The oncoming path storage unit 34 stores the oncoming path 15B next to the host path 15A transmitted from the management device 21. The control device 30B receives the oncoming path 15B in front in the course of the oncoming vehicle 2B transmitted from the management device 21. The oncoming path storage unit 41 stores the oncoming path 15B in front in the course of the oncoming vehicle 2B transmitted from the management device 21.

The obstacle presence/absence determination unit 36 determines whether or not the obstacle 11A is located on the host path 15A in front in the course of the host vehicle 2A based on the detection data from the obstacle sensor 76 of the host vehicle 2A and the host path 15A stored in the host path storage unit 33 (Step SA2).

When it is determined in Step SA2 that the obstacle 11A is not located on the host path 15A (Step SA2: No), the obstacle presence/absence determination unit 36 determines whether or not the obstacle 11A is located on the oncoming path 15B next to the host path 15A based on the detection data from the obstacle sensor 76 of the host vehicle 2A and the oncoming path 15B stored in the oncoming path storage unit 34 (Step SA3).

When it is determined in Step SA3 that the obstacle 11B is not located on the oncoming path 15B (Step SA3: No), the control device 30A returns to the processing of Step SA1.

The travel control unit 39 controls the travel device 51A of the host vehicle 2A so that the host vehicle 2A travels along the host path 15A.

When it is determined in Step SA2 that the obstacle 11A is located on the host path 15A (Step SA2: Yes), the obstacle position calculation unit 37 calculates the position of the obstacle 11A based on the detection data from the position sensor 71 of the host vehicle 2A and the detection data from the obstacle sensor 76 of the host vehicle 2A. The obstacle position transmission unit 38 transmits, to the management device 21, the position of the obstacle 11A calculated by the obstacle position calculation unit 37 (Step SA4).

When it is determined that the obstacle 11A is located on the host path 15A, the travel control unit 39 controls the travel device 51A of the host vehicle 2A so that the host vehicle 2A stops (Step SA5).

When it is determined in Step SA3 that the obstacle 11B is located on the oncoming path 15B (Step SA3: Yes), the obstacle position calculation unit 37 calculates the position of the obstacle 11B based on the detection data from the position sensor 71 of the host vehicle 2A and the detection data from the obstacle sensor 76 of the host vehicle 2A (Step SA6).

The obstacle position transmission unit 38 transmits, to the management device 21, the position of the obstacle 11B calculated in Step SA6 (Step SA7).

The management device 21 receives the position of the obstacle 11B transmitted from the control device 30A.

The avoidance path generation unit 29 generates the avoidance path 15C for causing the oncoming vehicle 2B to avoid the obstacle 11B in at least a part of the oncoming path 15B based on the position of the obstacle 11B transmitted from the control device 30A (Step SC2).

Figure 8:
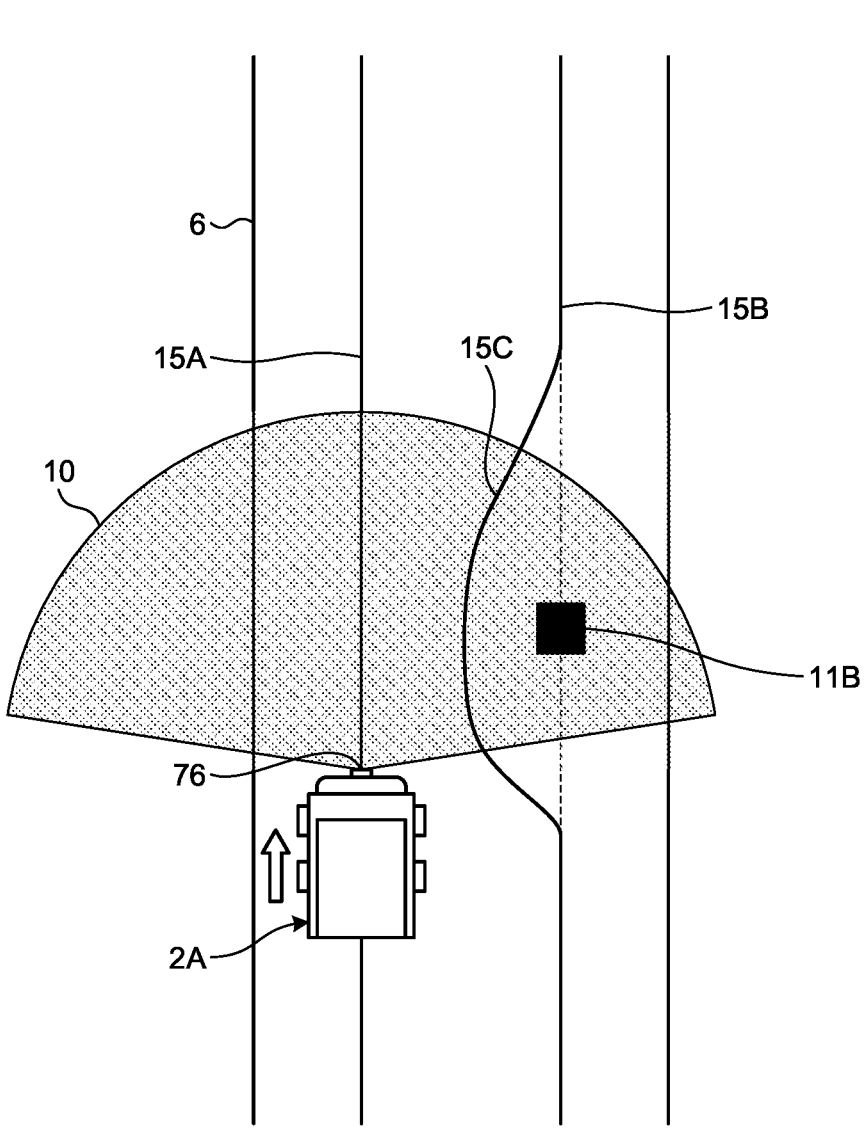
FIG. 8 is a schematic diagram for illustrating an avoidance path according to the embodiment.

FIG. 8 is a schematic diagram for illustrating the avoidance path 15C according to the embodiment. As illustrated in FIG. 8, when the obstacle 11B is located on the oncoming path 15B next to the host path 15A, the avoidance path 15C for avoiding the obstacle 11B is generated in at least a part of the oncoming path 15B next to the host path 15A. The avoidance path 15C is generated by changing a part of the oncoming path 15B next to the host path 15A. The avoidance path 15C is connected to the existing oncoming path 15B at one end and the other end. One end of the avoidance path 15C is located on the front side of the obstacle 11B in the course of the oncoming vehicle 2B. The other end of the avoidance path 15C is located on the rear side of the obstacle 11B in the course of the oncoming vehicle 2B. The avoidance path 15C is generated so as not to overlap the obstacle 11B.

Here, an object detected by the obstacle sensor 37 of the host vehicle 2A may be the oncoming vehicle 2B. In this case, the management device 21 determines whether or not the detected obstacle is the oncoming vehicle 2B based on the position of the obstacle received from the host vehicle 2A and the position of the oncoming vehicle 2B received from the oncoming vehicle 2B. When determining that the position of the obstacle is the same as the position of the oncoming vehicle 2B received from the oncoming vehicle 2B, the management device 21 determines the detected obstacle as the oncoming vehicle 2B. When the obstacle is the oncoming vehicle 2B, the management device 21 may make a setting for not generating the avoidance path. Furthermore, the host vehicle 2A may analyze the detection data from the obstacle sensor 37 to determine whether or not the obstacle is the oncoming vehicle 2B. When the obstacle sensor 37 is a camera, whether the obstacle is the oncoming vehicle 2B can be determined by image analysis. Furthermore, when the obstacle sensor 37 is Lidar, whether the obstacle is the oncoming vehicle 2B can be determined based on the shape of a measurement range calculated by a reflected wave. When it is determined that the obstacle is the oncoming vehicle 2B, the position of the obstacle may be prevented from being transmitted to the management device 21. That is, when an obstacle is detected and the obstacle is the oncoming vehicle 2B, the above-described processing of Step SA7 may be prevented from being executed.

The second path transmission unit 27 transmits the oncoming path 15B including the avoidance path 15C generated in Step SC2 to the control device 30B of the oncoming vehicle 2B (Step SC3).

The control device 30B receives the oncoming path 15B including the avoidance path 15C. The oncoming path storage unit 41 stores the oncoming path 15B including the avoidance path 15C transmitted from the management device 21.

The travel control unit 42 determines whether or not a distance Lc between the oncoming vehicle 2B and the obstacle 11B is a specified value or more at the time point when the oncoming path reception unit 40 of the oncoming vehicle 2B receives the avoidance path 15C (Step SB2).

When it is determined in Step SB2 that the distance Lc between the oncoming vehicle 2B and the obstacle 11B is a specified value or more (Step SB2: Yes), the travel control unit 42 controls the travel device 51B of the oncoming vehicle 2B so that the oncoming vehicle 2B travels along the avoidance path 15C (Step SB3).

When it is determined in Step SB2 that the distance Lc between the oncoming vehicle 2B and the obstacle 11B is less than a specified value (Step SB2: No), the travel control unit 42 controls the travel device 51B of the oncoming vehicle 2B so that the oncoming vehicle 2B stops (Step SB4).

Figure 9:
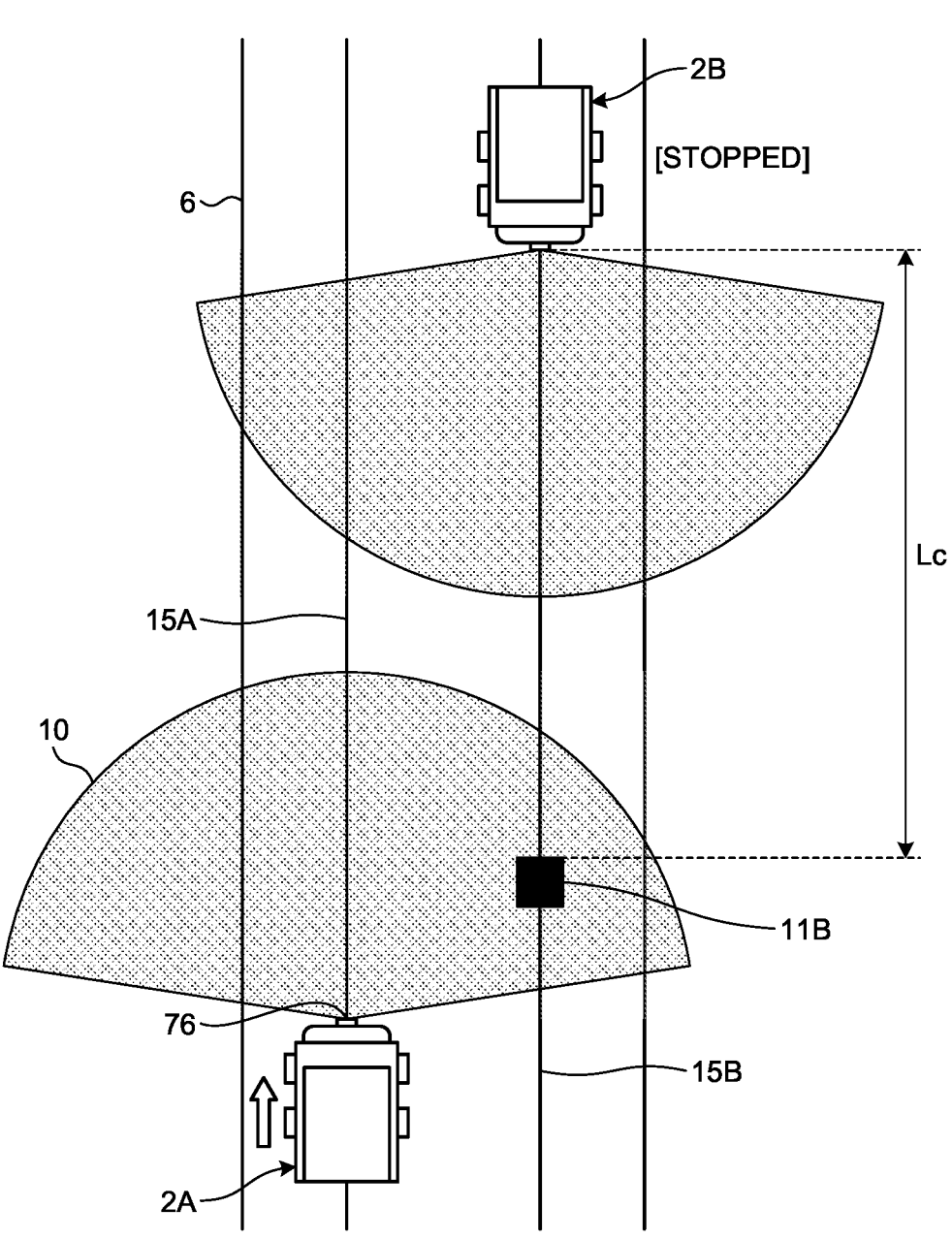
FIG. 9 is a schematic diagram for illustrating a distance between an oncoming vehicle and an obstacle according to the embodiment.

FIG. 9 is a schematic diagram for illustrating the distance Lc between the oncoming vehicle 2B and the obstacle 11B according to the embodiment. As illustrated in FIG. 9, when the distance Lc between the oncoming vehicle 2B and the obstacle 11B is less than a specified value at the time point when the oncoming path reception unit 40 receives the avoidance path 15C, the travel control unit 42 controls the travel device 51B of the oncoming vehicle 2B so that the oncoming vehicle 2B stops. The specified value is 20 [m] in one example. When the distance Lc between the oncoming vehicle 2B and the obstacle 11B is short at the time point when the oncoming path reception unit 40 receives the avoidance path 15C, steering of the front wheels 53F performed by the steering device 58 of the oncoming vehicle 2B may fail to be in time even if an attempt is made to cause the oncoming vehicle 2B to travel along the avoidance path 15C. Therefore, when the distance Lc between the oncoming vehicle 2B and the obstacle 11B is less than a specified value at the time point when the oncoming path reception unit 40 receives the avoidance path 15C, the travel control unit 42 controls the travel device 51B of the oncoming vehicle 2B so that the oncoming vehicle 2B stops.

When the distance Lc between the oncoming vehicle 2B and the obstacle 11B is a specified value or more at the time point when the oncoming path reception unit 40 receives the avoidance path 15C, the travel control unit 42 controls the travel device 51B of the oncoming vehicle 2B so that the oncoming vehicle 2B travels along the avoidance path 15C. This enables the oncoming vehicle 2B to travel on the travel path 6 without stopping. Therefore, a decrease in productivity of the work site 1 is inhibited.

[Computer System]

Figure 10:
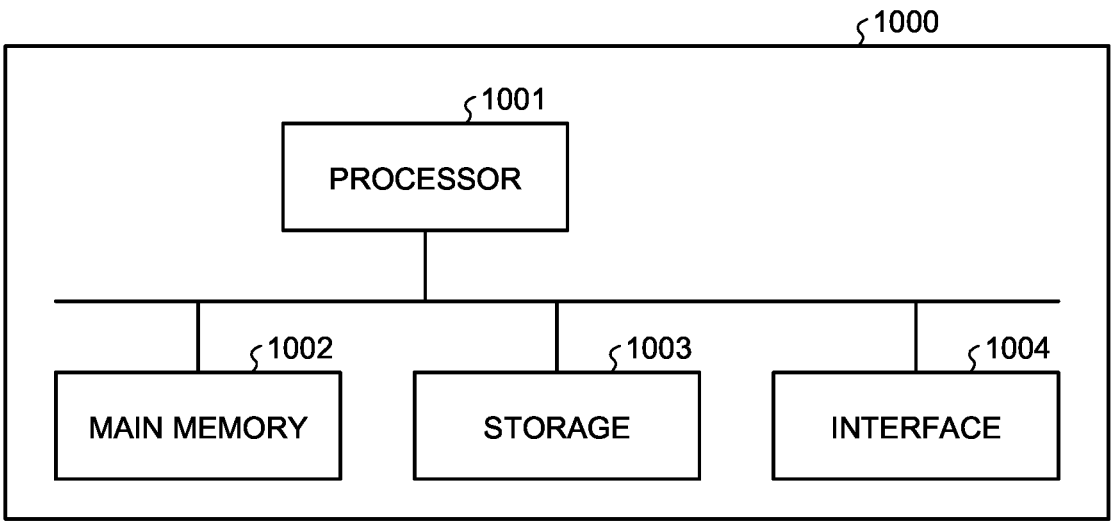
FIG. 10 is a block diagram illustrating a computer system according to the embodiment.

FIG. 10 is a block diagram illustrating a computer system 1000 according to the embodiment. Each of the management device 21 and the control device 30 described above includes the computer system 1000. The computer system 1000 includes a processor 1001 such as a central processing unit (CPU), a main memory 1002, a storage 1003, and an interface 1004. The main memory 1002 includes a nonvolatile memory such as a read only memory (ROM) and a volatile memory such as a random access memory (RAM). The interface 1004 includes an input/output circuit. Each of the functions of the management device 21 and the control device 30 described above is stored in the storage 1003 as a computer program. The processor 1001 reads the computer program from the storage 1003, develops the computer program in the main memory 1002, and executes the above-described processing in accordance with the computer program. Note that the computer program may be distributed to the computer system 1000 via a network.

In accordance with the above-described embodiment, the computer program or the computer system 1000 can execute: giving each of the host path 15A and the oncoming path 15B to the host vehicle 2A; giving the oncoming path 15B to the oncoming vehicle 2B of the host vehicle 2A; causing the host vehicle 2A to travel along the host path 15A; causing the oncoming vehicle 2B to travel along the oncoming path 15B; and determining whether or not the obstacle 11B is located on the oncoming path 15B in front in the course of the oncoming vehicle 2B based on the detection data from the obstacle sensor 76 provided in the host vehicle 2A.

Furthermore, in accordance with the above-described embodiment, the computer program or the computer system 1000 can execute causing the host vehicle 2A to store: the host path 15A between the host position Pa indicating the position of the host vehicle 2A and the front position Pb away from the host position Pa by the predetermined distance La toward the front in the course; and the oncoming path 15B of the predetermined distance Lb specified next to the host path 15A.

Furthermore, in accordance with the above-described embodiment, the computer program or the computer system 1000 can execute calculating the position of the obstacle 11B based on the detection data from the position sensor 71 that detects the position of the host vehicle 2A and the detection data from the obstacle sensor 76.

Furthermore, in accordance with the above-described embodiment, the computer program or the computer system 1000 can execute generating the avoidance path 15C for causing the oncoming vehicle 2B to avoid the obstacle 11B in at least a part of the oncoming path 15B based on the position of the obstacle 11B.

Furthermore, in accordance with the above-described embodiment, the computer program or the computer system 1000 can execute: giving the avoidance path 15C to the oncoming vehicle 2B; and causing the oncoming vehicle 2B to travel along at least one of the oncoming path 15B and the avoidance path 15C.

Furthermore, in accordance with the above-described embodiment, the computer program or the computer system 1000 can execute: when the distance Lc between the oncoming vehicle 2B and the obstacle 11B is a specified value or more at the time point when the oncoming vehicle 2B receives the avoidance path 15C, causing the oncoming vehicle 2B to travel along the avoidance path 15C; and, when the distance Lc is less than the specified value at the time point, stopping the oncoming vehicle 2B.

[Effects]

As described above, according to the embodiment, the host vehicle 2A includes: the travel device 51A; the obstacle sensor 76; the host path storage unit 33 that stores the host path 15A; the travel control unit 39 that controls the travel device 51A based on the host path 15A; the oncoming path storage unit 34 that stores the oncoming path 15B to be given to the oncoming vehicle 2B; and the obstacle presence/absence determination unit 36 that determines whether or not the obstacle 11B is located on the oncoming path 15B in front in the course of the oncoming vehicle 2B based on the detection data from the obstacle sensor 76.

The obstacle sensor 76 of the host vehicle 2A can detect not only the obstacle 11A located on the host path 15A in front in the course of the host vehicle 2A but the obstacle 11B located on the oncoming path 15B next to the host path 15A. The obstacle presence/absence determination unit 36 of the control device 30A of the host vehicle 2A can determine whether or not the obstacle 11B is located on the oncoming path 15B next to the host path 15A based on the detection data from the obstacle sensor 76. This causes the control device 30A of the host vehicle 2A to early detect the obstacle 11B located on the oncoming path 15B next to the host path 15A even in a situation in which the oncoming vehicle 2B is away from the oncoming path 15B next to the host path 15A and the obstacle sensor 76 of the oncoming vehicle 2B cannot detect the obstacle 11B. Furthermore, the oncoming path storage unit 34 of the control device 30A of the host vehicle 2A stores the oncoming path 15B next to the host path 15A. That is, the control device 30A of the host vehicle 2A is given not only the host path 15A but the oncoming path 15B. Therefore, the obstacle presence/absence determination unit 36 of the control device 30A of the host vehicle 2A can appropriately determine whether or not the obstacle 11B is located on the oncoming path 15B next to the host path 15A based on the detection data from the obstacle sensor 76 and the oncoming path 15B stored in the oncoming path storage unit 34. The obstacle 11B can be early and appropriately detected, so that measures can be taken to inhibit a decrease in productivity of the work site 1. Examples of the measures include removing the obstacle 11B from the oncoming path 15B before the oncoming vehicle 2B approaches the obstacle 11B. Therefore, a decrease in productivity of the work site 1 where the unmanned vehicle 2 operates is inhibited.

The host path storage unit 33 stores the host path 15A in front in the course of the host vehicle 2A among host paths 15A generated by the host path generation unit 24. The oncoming path storage unit 34 stores the oncoming path 15B next to the host path 15A among oncoming paths 15B generated by the oncoming path generation unit 25. At least a part of the oncoming path 15B next to the host path 15A is included in the detection range 10 of the obstacle sensor 76 of the host vehicle 2A. The oncoming path storage unit 34 stores the oncoming path 15B that can be detected by the obstacle sensor 76 of the host vehicle 2A. This causes the oncoming path 15B necessary for determining the presence or absence of the obstacle 11B to be given to the control device 30A of the host vehicle 2A.

The position of the obstacle 11B is calculated based on the detection data from the position sensor 71 that detects the host position Pa of the host vehicle 2A and the detection data from the obstacle sensor 76. Since the position of the obstacle 11B is calculated, whether or not the obstacle 11B is located on the oncoming path 15B is appropriately determined. Furthermore, measures for inhibiting a decrease in productivity of the work site 1 are quickly taken based on the position of the obstacle 11B.

The avoidance path 15C for causing the oncoming vehicle 2B to avoid the obstacle 11B is generated based on the position of the obstacle 11B. Even when the obstacle 11B is located on the oncoming path 15B, the oncoming vehicle 2B can travel along the avoidance path 15C without stopping. Since the oncoming vehicle 2B does not need to stop, a decrease in productivity of the work site 1 is inhibited.

When the distance Lc between the oncoming vehicle 2B and the obstacle 11B is less than a specified value at the time point when the oncoming path reception unit 40 receives the avoidance path 15C, the travel control unit 42 controls the travel device 51B of the oncoming vehicle 2B so that the oncoming vehicle 2B stops. This inhibits the steering device 58 of the oncoming vehicle 2B from being sharply actuated.

Other Embodiments

In the above-described embodiment, the first path transmission unit 26 transmits a part of the host path 15A generated by the host path generation unit 24 to the control device 30A of the host vehicle 2A. The first path transmission unit 26 may collectively transmit all the host paths 15A generated by the host path generation unit 24 to the control device 30A of the host vehicle 2A. Similarly, the first path transmission unit 26 may collectively transmit all the oncoming paths 15B generated by the oncoming path generation unit 25 to the control device 30A of the host vehicle 2A. The second path transmission unit 27 may collectively transmit all the oncoming paths 15B generated by the oncoming path generation unit 25 to the control device 30B of the oncoming vehicle 2B.

In the above-described embodiments, at least a part of the functions of the management device 21 may be provided in the control device 30, or at least a part of the functions of the control device 30 may be provided in the management device 21.

For example, the function of the avoidance path generation unit 29 may be provided in the control device 30A of the host vehicle 2A. The avoidance path generation unit 29 provided in the control device 30A can generate the avoidance path 15C for causing the oncoming vehicle 2B to avoid the obstacle 11B in at least a part of the oncoming path 15B based on the position of the obstacle 11B. The avoidance path 15C generated in the control device 30A of the host vehicle 2A may be transmitted to the control device 30B of the oncoming vehicle 2B via the management device 21, or may be transmitted to the control device 30B of the oncoming vehicle 2B without the management device 21.

For example, the function of the obstacle presence/absence determination unit 36 may be provided in the management device 21. The obstacle presence/absence determination unit 36 provided in the management device 21 can determine whether or not the obstacle 11B is located on the oncoming path 15B next to the host path 15A based on the detection data from the obstacle sensor 76 provided in the host vehicle 2A. The detection data from the obstacle sensor 76 provided in the host vehicle 2A is transmitted to the management device 21 via the communication system 23, whereby the obstacle presence/absence determination unit 36 provided in the management device 21 can determine whether or not the obstacle 11B is located on the oncoming path 15B.

For example, the function of the obstacle position calculation unit 37 may be provided in the management device 21. The obstacle position calculation unit 37 provided in the management device 21 can calculate the position of the obstacle 11B based on the detection data from the position sensor 71 that detects the position of the host vehicle 2A and the detection data from the obstacle sensor 76. The detection data from the position sensor 71 provided in the host vehicle 2A and the detection data from the obstacle sensor 76 are transmitted to the management device 21 via the communication system 23, whereby the obstacle position calculation unit 37 provided in the management device 21 can calculate the position of the obstacle 11B located on the oncoming path 15B.

In the above-described embodiment, each of the host path generation unit 24, the oncoming path generation unit 25, the first path transmission unit 26, the second path transmission unit 27, the obstacle position reception unit 28, the avoidance path generation unit 29, the host path reception unit 31, the oncoming path reception unit 32, the host path storage unit 33, the oncoming path storage unit 34, the detection data acquisition unit 35, the obstacle presence/absence determination unit 36, the obstacle position calculation unit 37, the obstacle position transmission unit 38, the travel control unit 39, 5 the oncoming path reception unit 40, the oncoming path storage unit 41, and the travel control unit 42 may be configured by separate hardware (computer system).

In the above-described embodiment, the unmanned vehicle 2 is a dump truck, which is a type of haul vehicle. The unmanned vehicle 2 is required to be a work vehicle capable of performing work in the work site 1.

REFERENCE SIGNS LIST

1 Work Site
2 Unmanned Vehicle
2A Host Vehicle (First Unmanned Vehicle)
2B Oncoming Vehicle (Second Unmanned Vehicle)
3 Travel Area
4 Loading Place
5 Soil Discharging Place
6 Travel Path
7 Loader
8 Crusher
9 Control Facility
10 Detection Range
11A Obstacle
11B Obstacle
14 Travel Point
15 Travel Path
15A Host Path (First Travel Path)
15B Oncoming Path (Second Travel Path)
15C Avoidance Path
20 Management System
21 Management Device
22 Input Device
23 Communication System
23A Wireless Communication Device
23B Wireless Communication Device
24 Host Path Generation Unit
25 Oncoming Path Generation Unit
26 First Path Transmission Unit
27 Second Path Transmission Unit
28 Obstacle Position Reception Unit
29 Avoidance Path Generation Unit
30 Control Device
30A Control Device
30B Control Device 31 Host Path Reception Unit
32 Oncoming Path Reception Unit
33 Host Path Storage Unit
34 Oncoming Path Storage Unit
35 Detection Data Acquisition Unit
36 Obstacle Presence/Absence Determination Unit
37 Obstacle Position Calculation Unit
38 Obstacle Position Transmission Unit
39 Travel Control Unit
40 Oncoming Path Reception Unit
41 Oncoming Path Storage Unit
42 Travel Control Unit
50 Vehicle Body
51 Travel Device
51A Travel Device
51B Travel Device
52 Dump Body
53 Wheel
53F Front Wheel
53R Rear Wheel
54 Tire
54F Front Tire
54R Rear Tire
55 Drive Device
56 Brake Device
57 Transmission Device
58 Steering Device
71 Position Sensor
72 Orientation Sensor
73 Inclination Sensor
74 Speed Sensor
75 Steering Sensor
76 Obstacle Sensor
100 Control System
1000 Computer System
1001 Processor
1002 Main Memory
1003 Storage
1004 Interface
La Predetermined Distance
Lb Predetermined Distance
Lc Distance
Pa Host Position
Pb Front Position
Pc Other Vehicle Position
Pd Front Position.

The invention claimed is:
1. An unmanned vehicle traveling on a host path, comprising:
a vehicle body;
a travel device;
an obstacle sensor disposed on the vehicle body;
a processor, wherein the processor:
stores a host path;
controls the travel device based on the host path;
stores an oncoming path to be given to an oncoming vehicle, wherein a detection range of the obstacle sensor includes the oncoming path; and
determines whether or not an obstacle is located on the oncoming path while traveling on the host path based on detection data of the detection range of the obstacle sensor including the oncoming path.
2. The unmanned vehicle traveling on the host path according to claim 1,
wherein the detection range of the obstacle sensor includes the host path and the oncoming path.

3. The unmanned vehicle traveling on the host path according to claim 2, wherein the processor is further configured to:

determine whether or not an obstacle is located on the host path and the oncoming path while traveling on the host path based on detection data of the detection range of the obstacle sensor including the host path and the oncoming path.

4. The unmanned vehicle traveling on the host path according to claim 1, wherein the processor is further configured do determine whether or not an obstacle is located on the oncoming path while traveling on the host path based on detection data of the detection range including the oncoming path and based on the oncoming path.

5. The unmanned vehicle traveling on the host path according to claim 1, wherein the processor is further configured to determine whether or not an obstacle detected by the obstacle sensor is the oncoming vehicle.

6. The unmanned vehicle traveling on the host path according to claim 1, further comprising:

a position sensor that detects a host position, and wherein the processor is further configured to determine a position of an obstacle located on the oncoming path while traveling on the host path based on detection data from an position sensor and detection data of the detection range of the obstacle sensor including the oncoming path.

7. The unmanned vehicle traveling on the host path, according to claim 6, wherein the processor is further configured to generate an avoidance path for causing the oncoming vehicle travelling on the oncoming path to avoid the obstacle based on a position of the obstacle.

8. A system of controlling an unmanned vehicle comprising a processor, wherein the processor:

generates a host path to be given to a first unmanned vehicle;

generates an oncoming path to be given to a second unmanned vehicle, which is an oncoming vehicle of the first unmanned vehicle;

transmits the host path and the oncoming path to the first unmanned vehicle;

transmits the oncoming path to the second unmanned vehicle, wherein a detection range of an obstacle sensor provided in the first unmanned vehicle includes the oncoming path, and determines whether or not an obstacle is located on the oncoming path while traveling on the host path based on detection data of the detection ranges of the obstacle sensor including the oncoming path.

9. The system of controlling an unmanned vehicle, according to claim 8, wherein the detection range of the obstacle sensor includes the host path and the oncoming path.

10. The system of controlling an unmanned vehicle, according to claim 9, wherein the processor is further configured to:

wherein the processor determines whether or not an obstacle is located on the host path and the oncoming path while traveling on the host path based on detection data of the detection range of the obstacle sensor including the host path and the oncoming path.

11. The system of controlling an unmanned vehicle, according to claim 8, wherein the processor is further configured to:

determines whether or not an obstacle is located on the oncoming path while traveling on the host path based on detection data of the detection range including the oncoming path and based on the oncoming path.

12. The system of controlling an unmanned vehicle, according to claim 8, wherein the processor is configured to determine whether or not an obstacle detected by the obstacle sensor is the oncoming vehicle.

13. The system of controlling an unmanned vehicle, according to claim 8, further comprising:

a position sensor that detects a host position and wherein the processor is configured to calculate a position of an obstacle located on the oncoming path while traveling on the host path based on detection data from the position sensor and detection data of the detection range of the obstacle sensor including the oncoming path.

14. The system of controlling an unmanned vehicle according to claim 13, wherein the processor is further configured to:

generate an avoidance path; and cause the oncoming vehicle to travelling along the oncoming path to avoid the obstacle based on the position of the obstacle.

15. A method of controlling an unmanned vehicle, comprising:

giving each of a host path and an oncoming path to a first unmanned vehicle;

giving the oncoming path to a second unmanned vehicle, which is an oncoming vehicle of the first unmanned vehicle;

causing the first unmanned to travel along the host path;

causing the second unmanned vehicle to travel along the oncoming path, wherein a detection range of an obstacle sensor provided in the first unmanned vehicle includes the oncoming path; and determining whether or not an obstacle is located on the oncoming path while traveling on the host path based on detection data of the detection range of the obstacle sensor including the oncoming path.

16. The method of controlling an unmanned vehicle, according to claim 15, further comprising:

wherein the detection range of the obstacle sensor includes the host path and the oncoming path, and determining whether or not an obstacle is located on the host path and the oncoming path while traveling on the host path based on the detection data of the detection range.

17. The method of controlling an unmanned vehicle, according to claim 15, further comprising:

determining whether or not an obstacle is located on the oncoming path while traveling on the host path based on detection data of the detection range including the oncoming path and based on the oncoming path.

18. The method of controlling an unmanned vehicle, according to claim 17, further comprising:

determining whether or not an obstacle detected by the obstacle sensor is the oncoming vehicle.

19. The method of controlling an unmanned vehicle, according to claim 15, further comprising, detecting a host position via a position sensor; and calculating a position of an obstacle located on the oncoming path while traveling on the host path based on detection data from the position sensor and detection data of the detection range of the obstacle sensor including the oncoming path.

20. The method of controlling an unmanned vehicle, according to claim 19, further comprising, generating an avoidance path for causing the oncoming vehicle traveling on the oncoming path to avoid the obstacle based on the position of the obstacle.

* * * * *